US006428750B1

(12) United States Patent
Rainin et al.

(10) Patent No.: US 6,428,750 B1
(45) Date of Patent: Aug. 6, 2002

(54) VOLUME ADJUSTABLE MANUAL PIPETTE WITH QUICK SET VOLUME ADJUSTMENT

(75) Inventors: Kenneth Rainin, Piedmont; Haakon T. Magnussen, Jr., Orinda; Phillip Yee; William D. Homberg, both of San Francisco; James S. Petrek, Danville, all of CA (US)

(73) Assignee: Rainin Instrument, LLC, Oakland, CA (US)

(*) Notice: Subject to any disclaimer, the term of this patent is extended or adjusted under 35 U.S.C. 154(b) by 0 days.

(21) Appl. No.: 09/548,439

(22) Filed: Apr. 13, 2000

Related U.S. Application Data

(63) Continuation-in-part of application No. 09/507,110, filed on Feb. 17, 2000.

(51) Int. Cl.[7] .............................. B01L 3/02; G01N 1/10; B67D 5/38

(52) U.S. Cl. .................... 422/100; 436/180; 73/864.01; 73/864.11; 73/864.13; 73/864.14; 73/864.16; 73/864.18; 73/863.32; 222/154

(58) Field of Search ................ 422/100, 99; 73/863.32, 73/869.01, 864.11, 864.13, 864.16, 864.18, 864.14; 436/180; 222/8, 154

(56) References Cited

U.S. PATENT DOCUMENTS 4,096,750 A * 6/1978 Sturm
4,096,751 A * 6/1978 Withers et al.
4,250,755 A * 2/1981 Kenny
4,263,257 A * 4/1981 Metsala ...................... 422/100
4,268,481 A * 5/1981 Suovaniemi et al. ....... 422/100
4,298,575 A * 11/1981 Berglund ................. 73/846.13
4,554,134 A * 11/1985 Terramaki et al. .......... 422/100
4,567,780 A * 2/1986 Oppenlander et al. ... 73/864.16
4,763,535 A * 8/1988 Rainin et al. ............ 73/864.18
4,779,467 A * 10/1988 Rainin et al. ............ 73/864.17
4,815,632 A * 3/1989 Ball et al. ..................... 222/23
4,909,991 A * 3/1990 Oshikubo ................... 422/100
5,012,682 A * 5/1991 Sabloewski
5,104,624 A * 4/1992 Labriola ..................... 422/100
5,330,721 A * 7/1994 Tervamaki .................. 422/100
5,347,878 A * 9/1994 Suovaniemi
5,364,596 A * 11/1994 Magnussen, Jr. et al. ... 422/100
5,389,341 A * 2/1995 Tuunanen et al. .......... 422/100
5,413,006 A * 5/1995 D'Autry
5,531,131 A * 7/1996 Sabloewski .............. 73/864.18
5,614,153 A * 3/1997 Homberg .................... 422/100
5,650,124 A * 7/1997 Gilson
5,672,320 A * 9/1997 Ritter ......................... 422/100
5,747,709 A * 5/1998 Oshikubo ................ 73/864.18
5,792,424 A * 8/1998 Homberg et al. ........... 422/100
5,892,161 A * 4/1999 Conley et al.
6,170,343 B1 * 1/2001 Conley et al.
6,254,832 B1 * 7/2001 Rainin et al. ............... 422/100
6,295,880 B1 * 10/2001 Gilson
6,299,841 B1 * 10/2001 Rainin et al. ............... 422/100
2001/0055547 A1 * 12/2001 Rainin et al.

* cited by examiner

*Primary Examiner*—Jill Warden
*Assistant Examiner*—B. R Gordon
(74) *Attorney, Agent, or Firm*—Robert R. Meads

(57) ABSTRACT

A volume adjustable manual pipette having a hand-holdable housing supporting (i) an electronic digital display and associated position sensing and control circuitry, (ii) a plunger unit and (iii) a quick set volume adjustment mechanism for simultaneously controlling the volume setting of the pipette and the electronic display, the quick set volume adjustment mechanism comprising a pipette volume setting member for limiting upward movement of the plunger unit within the housing to define the volume setting for the pipette and the volume setting member being supported for axial movement on the plunger unit and releasably secured relative to the housing by a pipette user operable locking mechanism. When released from the housing, the volume setting member is axially moveable on and with the plunger unit to quickly set the volume for the pipette. When secured to the housing, the plunger unit is axially moveable relative to the volume setting unit to aspirate and dispense the selected volume of liquid into and from a pipette tip extending from a lower end of the housing. The volume setting of the pipette is monitored by the sensing and control circuitry to provide a real time display of the volume setting of the pipette.

17 Claims, 9 Drawing Sheets

VOLUME ADJUSTABLE MANUAL PIPETTE WITH QUICK SET VOLUME ADJUSTMENT

RELATED APPLICATION

This application is a continuation-in-part of U.S. patent application, Ser. No. 09/507,110, filed Feb. 17, 2000.

BACKGROUND

The present invention relates to volume adjustable manual pipettes and, more particularly, to an improved manual pipette including a quickly settable volume adjustment mechanism.

U.S. Pat. No. 3,827,305 describes one of the earliest commercially available digitally adjustable air displacement pipettes. To provide for volume adjustment, the pipette includes a threaded shaft extending through a fixed nut. Manual turning of the shaft produces axial movement of a stop member for limiting axial movement of a plunger to define a volume setting for the pipette. The volume setting is displayed on a mechanical micrometer display comprising a series of indicator rings each encircling the threaded shaft.

U.S. Pat. No. 4,909,991 describes a later commercially available single channel manual pipette manufactured by Nichiryo Co. Ltd., Tokyo, Japan. The Nichiryo pipette includes an elongated hand-holdable housing for an upwardly spring biased plunger. An upper end of the plunger extends above a top of the housing and carries a control knob for thumb and finger engagement in manually turning the plunger and for axially moving the plunger in the pipette housing between an upper stop and a lower stop at which all liquid within a tip secured to a lower end of the housing is expelled by the downward movement of the plunger. The upper stop is axially adjustable within the housing in response to a turning of a hollow volume adjustment screw or shaft keyed to the plunger. The axial adjustment of the upper stop adjusts the volume of liquid which the pipette is capable of drawing into the tip in response to upward movement of the plunger to the upper stop. The pipette also includes a lock mechanism including a lock knob for locking the plunger against rotation to thereby set the upper stop in a fixed position and hence set the volume adjustment for the pipette.

U.S. Pat. No. 5,849,248, assigned to the assignee of the present invention, describes a more recent adjustable volume manual pipette including an improved lock mechanism.

Volume adjustable manual pipettes with electronic digital displays have also been developed and are disclosed in U.S. Pat. Nos. 4,567,780; 5,892,161; and 5,892,161.

For a more complete understanding of the current state of the art relative to the volume adjustability of manual pipettes, each of the above-identified patents is incorporated by reference into this application.

In each of the foregoing prior manual pipettes, volume setting requires the repeated turning of either the threaded volume setting shaft or the turning of the displacement plunger of the pipette while viewing the volume display of the pipette. Where successive volume setting for a pipette are of values of considerable difference, appreciable time and physical effort are required to accomplish the volume settings.

Thus, one of the shortcomings of prior manual pipettes is the time, physical effort and care required to accurately manually set the volume of such pipettes. In an attempt to reduce the time required to change the volume settings of a manual pipette, the Socorex Micropipette Calibra 822 includes a volume setting mechanism including two cylindrical cams. A larger one of the cams shows numbers on a left side of a window of a mechanical volume display for the pipette while a smaller one of the cams shows numbers on a right side of the window. After locking of a plunger-button of the pipette, a turning of a setting wheel turns the larger cam to change the numbers displayed thereby. Then a pulling out of the setting wheel followed by a turning thereof produces a turning of the smaller cam and numbers displayed thereby. Such turning of the cams sets mechanical stops within the pipette to control the volume of liquid, which the pipette will aspirate and dispense. While the volume setting structure of the Calibra pipette may reduce slightly the time required to set the volume of a manual pipette, the volume setting structure is relatively complex and costly when compared to conventional manual pipette volume setting mechanisms as described above. Also, the volume setting provided by the Calibra pipette is not as fine a setting as is provided by conventional volume setting mechanisms.

Accordingly, there is a continuing need for a volume adjustable manual pipette including a simple volume adjustment mechanism characterized by quick and highly accurate adjustability. The present invention satisfies that need.

SUMMARY OF INVENTION

Basically, the present invention comprises a volume adjustable manual pipette having an axially elongated hand-holdable housing supporting (i) an electronic digital display and associated position sensing and control circuitry, (ii) a plunger unit and (iii) a quick set volume adjustment mechanism for simultaneously controlling the volume setting of the pipette and the electronic display. Basically, the quick set volume adjustment mechanism comprises a pipette volume setting member for limiting upward movement of the plunger unit within the housing to define the volume setting for the pipette. The volume setting member is supported for axial movement on the plunger unit and is releasably secured relative to the housing by a pipette user operable locking mechanism. When released from the housing, the volume setting member is axially moveable on and with the plunger unit to quickly set the volume for the pipette. When secured to the housing, the plunger unit is axially moveable relative to the volume setting unit to aspirate and dispense the selected volume of liquid into and from a pipette tip secured to a hollow shaft extending from a lower end of the housing. The volume setting of the pipette is monitored by the sensing and control circuitry to provide a real time display of the volume setting of the pipette on the electronic digital display.

Preferably, the volume setting member comprises an externally threaded upper stop member mating with a nut member and keyed to turn with the plunger unit such that when the volume setting member is axially secured by the locking mechanism relative to the housing, a pipette user turning of the plunger unit will adjust the axial position of the volume setting member within the housing to provide a fine adjustment of the volume setting of the pipette as displayed in real time by the electronic digital display.

DETAILED DESCRIPTION OF INVENTION

Figure 1A:
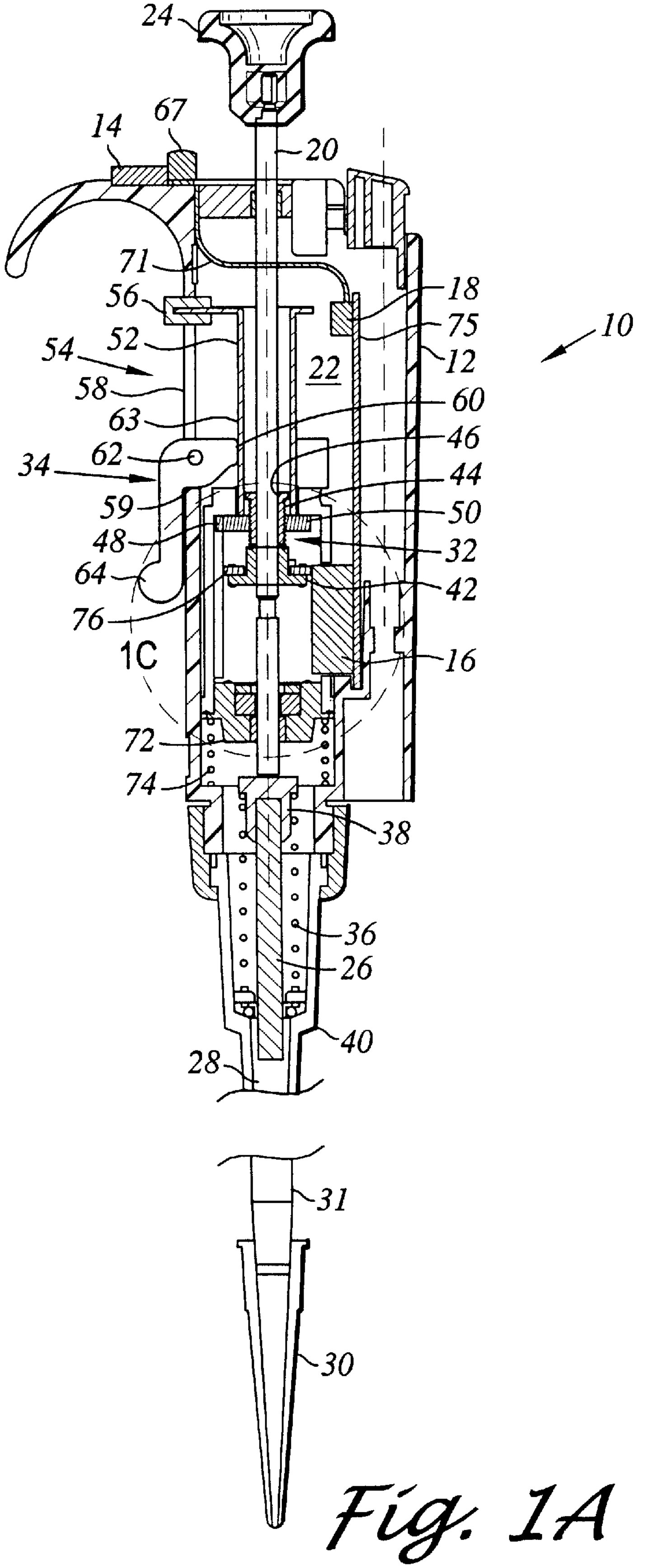
FIG. 1*a* is a fragmentary sectional side view of a first embodiment of a volume adjustable manual pipette having an axially elongated hand-holdable housing supporting an electronic digital display and associated position sensing and control circuitry, a plunger unit and a quick set volume adjustment mechanism for simultaneously controlling the volume setting of the pipette and the electronic display in accordance with the present invention. The quick set volume adjustment mechanism is shown in a locked condition with a lever lock engaging a tube of a slide-type volume adjuster.

As depicted generally in the drawings, the present invention comprises a volume adjustable manual pipette 10 having an axially elongated hand-holdable housing 12 supporting (i) an electronic digital display 14 and associated position sensing 16 and control circuitry 18, (ii) a plunger unit 20 and (iii) a quick set volume adjustment mechanism 22 for simultaneously controlling the volume setting of the pipette and the electronic display.

The plunger unit 20 is upwardly spring biased and supported for axial movement within the housing 12 with an upper end supporting a control knob 24 above a top of the housing. The housing is shaped for hand gripping by a pipette user with his or her thumb free to depress the control knob 24 and move a lower end of the plunger unit carrying a piston 26 downwardly into a cylinder 28 to dispense liquid from a pipette tip 30 secured to the hollow shaft 31 extending from the lower end of the housing.

Basically, the quick set volume adjustment mechanism 22 comprises a volume setting member 32 for limiting upward axial movement of the plunger unit 20 in the housing 12 to define the volume setting for the pipette 10. The volume setting member 32 is supported for axial movement on the plunger unit 20 and is releasably secured to the housing 12 by a pipette user operable locking mechanism 34. When released from the housing, the volume setting member 32 is moveable axially on and with the plunger unit 20 to rapidly set the volume of the pipette 10. When the volume setting member 32 is secured by the locking mechanism 34 to the housing 12, the plunger unit 20 is moveable axially relative to the volume setting member 32 to aspirate and dispense the selected volume of liquid into and from the pipette tip 30 secured to shaft 31 extending from the housing 12.

More particularly as depicted in FIGS. 1*a* and *b,* the plunger unit 20 is upwardly spring biased by a return spring 36 compressed between a piston return 38 and a bottom spring retainer 40. The upward bias provided by the return spring 36 causes the plunger unit 20 to move upwardly within the housing 12 until a flange member 42 fixed to the plunger engages a bottom surface of the volume setting member 32 comprising an externally threaded sleeve 44 having a hex-shaped axial bore 46 therethrough axially receiving a hex-shaped mid-portion 48 of the plunger 20. The externally threaded sleeve 44 comprising the volume setting member 32 mates with a rotationally fixed nut member 50. The nut member 50 is carried by a vertical tube 52 of a volume slide adjuster 54 having a knob 56 extending laterally through a window 58 in a side 59 of the housing 12. Thus supported, the plunger 20 extends vertically through the tube 52 and the sleeve 44 of the volume setting member 32 for axial movement relative thereto as in response to a pipette user pressing down on the control knob 24 to move the plunger unit downwardly within the housing 12 against the upward force of the return spring 36. However, a hand turning of the plunger unit 20 by the user will cause the plunger to turn the sleeve 44 of the volume setting member 32 within and relative to the nut member 50. This will cause the sleeve 44 to move axially relative to the stationary nut member 50 to vertically adjust the position of the bottom surface of the sleeve and hence the volume setting of the pipette as defined by the volume setting member 32 and the flange member 42 of the piston unit engaging the vertically adjusted bottom surface. Because of the relatively fine mating threads of the nut member 50 and sleeve 44 such volume adjustment is a fine adjustment of the volume of the pipette and is be distinguished from the quick setting of the volume for the pipette 10.

Figure 1B:
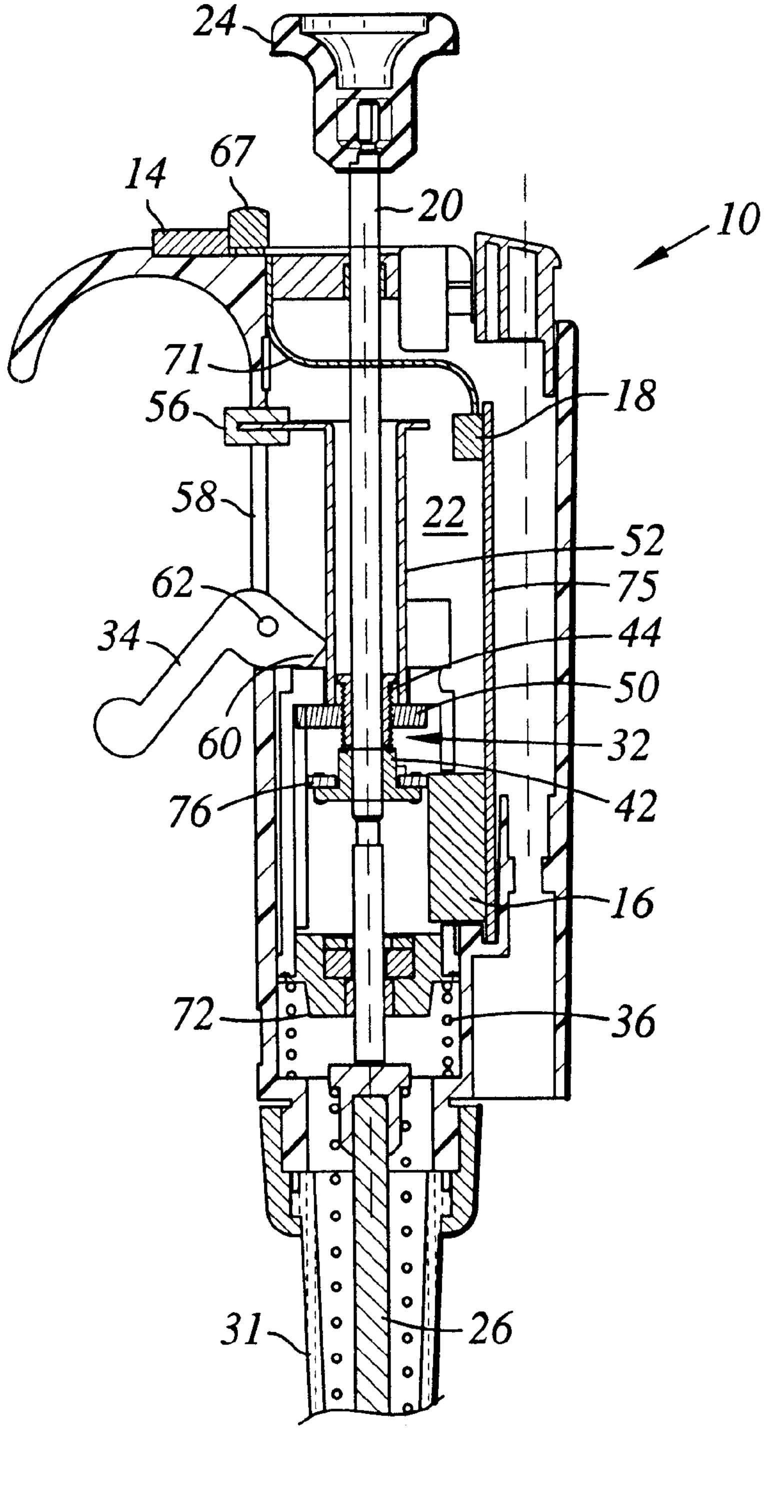
FIG. 1*b* shows the manual pipette of FIG. 1*a* with the lever lock released to allow vertical movement of the slide-type volume adjuster.

Such quick setting of the volume setting of the pipette 10 is provided by the pipette user rapidly adjusting the vertical location of the volume setting member 32 within the housing 12. In the illustrated embodiment of the present invention, this is accomplished by the user manually grasping the knob 56 and moving the volume slide adjuster 54 vertically along the side window 58 in the housing 12. Such movement of the slide adjuster 54 produces a corresponding vertical movement of the volume setting member 32 comprising the sleeve and the nut member 50 matingly engaged with the sleeve. As illustrated in FIGS. 1*a* and 1*b,* such vertical movement of the slide adjuster 54 is normally prohibited by the lever lock 34 which comprises a cam 60 pivotally connected to the housing 12 by a pin member 62 and engaging an outer vertical surface 63 of the tube 52. By grasping an arm 64 extending from the cam 60, the user is able to rotate the cam to the position shown in FIG. 1*b* releasing the tube 52 for vertical movement within the housing, such vertical movement allowing rapid vertical adjustment of the location of the volume setting member 32 and hence the volume setting of the pipette 10.

Such vertical movement of the volume setting member 32 produces a like vertical movement of the plunger unit 20 within the housing 12 since the flange member 42 of the plunger unit 20 is continuously urged by the return spring 36 upward against the bottom surface of the sleeve comprising the volume setting member 32. Accordingly, the plunger unit 20 follows any vertical adjustment of the volume setting member 32 within the housing. Such vertical movement of the volume setting member 32 and the plunger unit 20 is monitored by the sensor circuitry 16 which generates an electrical signal processed within the control circuitry 18 and visually displayed as a digital volume setting for the pipette on the display 14. Such a display rapidly depicts any changes in the volume setting for the pipette 10 and is a real time monitor of the value of such volume settings.

Figure 2:
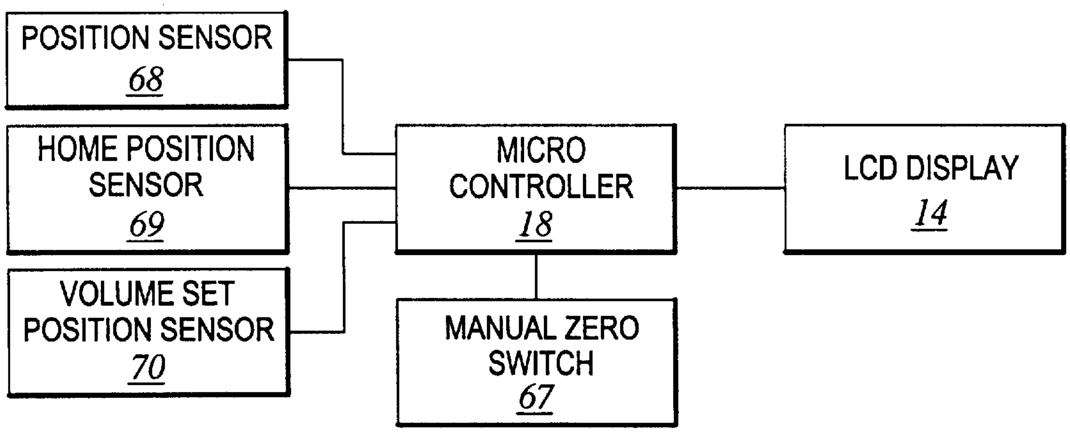
FIG. 2 is a block diagram of a typical electronic circuit including an electronic display and associated sensor and control circuitry as depicted in FIG. 1*a*, all in accordance with the present invention.

More particularly, the display, sensor and control circuitry are depicted in the block diagram of FIG. 2, while the structure supporting such circuitry is shown in FIGS. 1*a* and 1*b*. As shown in FIG. 2, the electronic digital display 14 may comprise a conventional LCD display controlled by a conventional microprocessor comprising the control circuitry 18. As illustrated, the electrical inputs to the micro-processor 18 may comprise a manual zero setting switch 67 located on top of the housing 12, and sensors comprising a position sensor 68, a home position sensor 69 and a volume set position sensor 70.

The position sensor 68 is a continuous sensing device with a sensor target 76 carried by the flange member 42 or otherwise attached to the plunger unit 20. In this regard. The sensor 16 is of a type which will sense the location of the particular type of sensor target 76. For example, if the sensor target 76 is a magnet, the sensor is of a type that will respond to the magnetic field generated by the magnet to produce an electrical signal indicative of the location of the magnet relative to the sensor. Such a position signal is transmitted to the micro-processor 18 for processing and control of the electrical input to the display 14 for controlling the number value digitally displayed thereby. This provides a continuous real time read out of the volumes of liquid in the pipette tip during aspiration and dispensing and other modes of operation of the pipette 10.

Figure 1C:
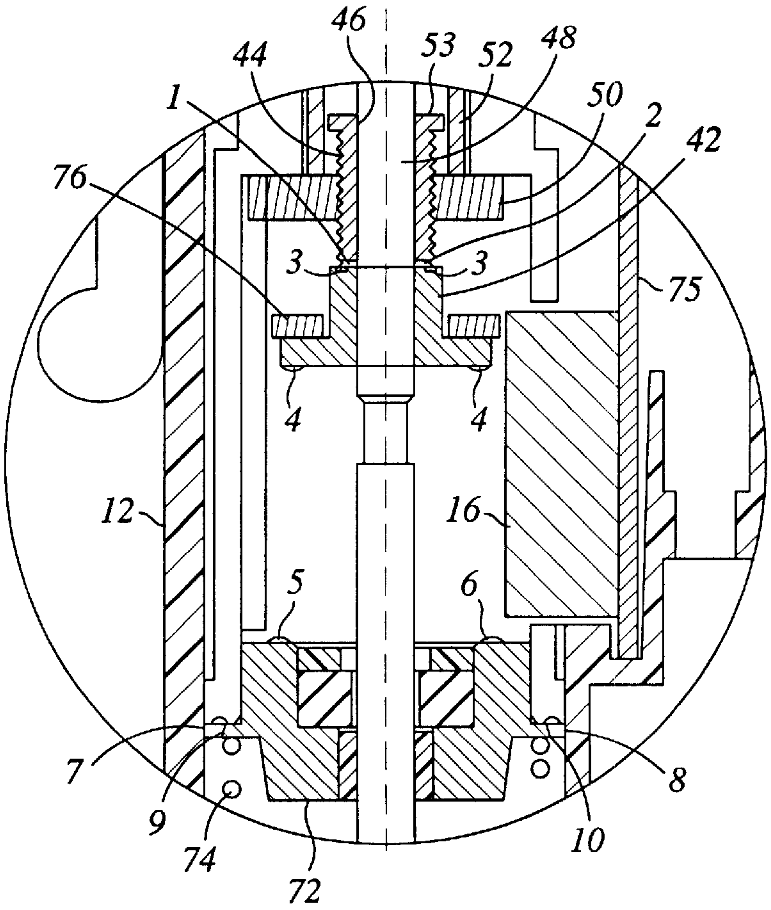
FIG. 1*c* is an enlarged view of the portion of FIG. 1*a* within the circle labeled 1*c*—1*c*.

Referring to FIG. 1*c* for the home position sensor 69, the home position is sensed when the plunger unit 20 is in a home position defined by flange member 42 engaging a bottom stop member 72 vertically supported within the housing by a blow out spring 74. When this occurs, contacts 7 and 8 carried by the housing 12 engage contacts 9 and 10 respectively, carried by the bottom stop member 72. Also, top contacts 5 and 6 carried by a top of the bottom stop member engage bottom contacts 4 carried by a bottom of the flange member 42. The contacts 8 and 10 are connected internally through the bottom stop member 72 to the contact 6 while the contacts 7 and 9 are connected internally through the bottom stop to the contact 5. The contacts 7 and 8 are connected to a printed circuit board (PCB) 75 carrying and electrically connecting the sensor 16 and the microprocessor 18. The microprocessor is programmed such that when the home position is sensed, an electrical signal is generated which "zero's" the display 14 electrically connected to the microprocessor by the ribbon cable 71. Movement of the plunger unit above and below the home position are then indicated by positive and negative values digitally displayed by the display 14.

The pipette volume set position sensor 70 is sensed when a closed circuit is formed from a contact 2 on the bottom surface of the sleeve comprising the volume setting member 32 to contact 3 carried by a top of the flange member 42 and back to a contact 1 carried by the bottom surface of the sleeve. This can only be sensed after the plunger unit 20 has been released by the user and the flange member 42 engages the sleeve in the volume setting position for the pipette. As previously described, when this occurs the electrical signal generated by the micro-processor produces a digital indication of the volume setting for the pipette 10 on the display 14.

The manual zero setting switch 67 is a conventional switch electrically connected as by a ribbon cable 71 to the micro-processor such that manual actuation of the switch by the pipette user will "zero" the digital volume displayed by the display 14. This feature is useful when a pipette user wishes to aspirate more that one liquid into the pipette tip 30 or in a multidispense mode of operation for the pipette to dispense the contents of a full tip into multiple aliquots.

For example, to dilute one sample with a diluent, a user would first set the maximum pickup volume for the pipette 10 to the sum of all the fluids to be picked up. The user would then insert the tip 30 into the diluent and carefully release the plunger button 24 until the volume readout indicated by the display 14 indicates the desired volume for the diluent. At that point, the user would remove the tip from the diluent reservoir and press the manual zero switch 67 to "zero" the volume display. Then while holding the tip in air, the user would release the plunger allowing the desired air gap volume to be drawn into the tip to separate the diluent from the sample liquid. Finally, the user would again "zero" the display and aspirate the desired sample volume of liquid into the tip.

In the multidispense mode of operation for the pipette 10, the pipette user would press the zero switch at the beginning of each aliquot and the display would read the dispensed volume relative to the zero point as a negative volume number.

Figure 3A:
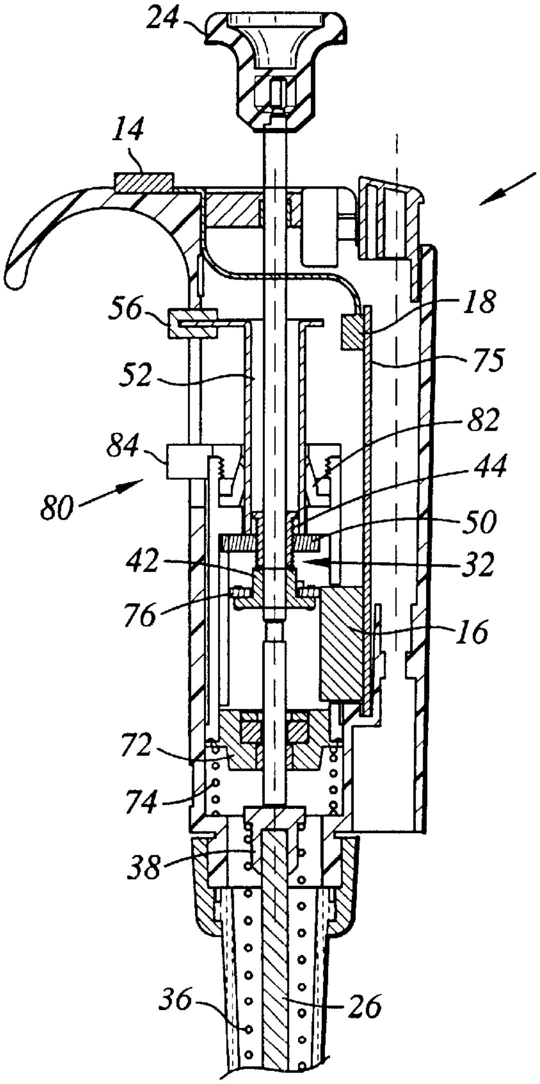
FIG. 3*a* is a sectional side view of an upper portion of a second embodiment of a volume adjustable manual pipette in a locked condition and having an axially elongated hand-holdable housing supporting an electronic digital display and associated position sensing and control circuitry, a plunger unit and a quick set volume adjustment mechanism for simultaneously controlling the volume setting of the pipette and the electronic display in accordance with the present invention.
Figure 3B:
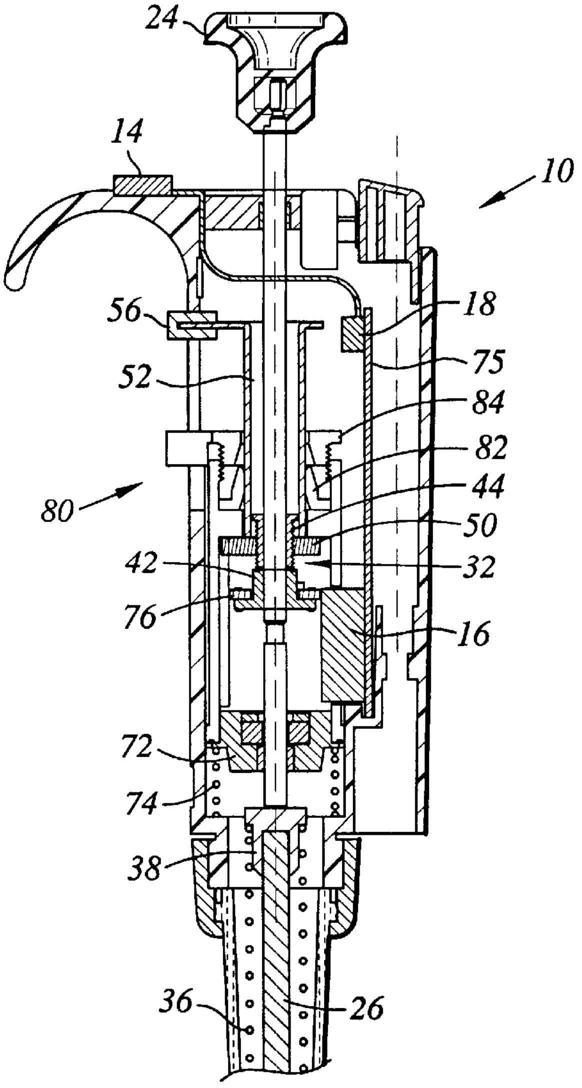
FIG. 3*b* shows the pipette of FIG. 3*a* in an unlocked condition.

Turning now to the other illustrated embodiments. of the present invention. FIGS. 3*a* and 3*b* illustrate a version of the pipette 10 substituting a friction brake or chuck mechanism 80 for the level lock mechanism of FIGS. 1*a* and 1*b*. The mechanism 80 comprises an annular wedge or friction brake member 82 surrounding the tube 52. The annular wedge 82 is compressed against the tube by an annular sleeve lock 84 as shown in FIG. 3*a*. A manual turning of the sleeve lock by a pipette user releases the mechanism 80 as shown in FIG. 3*b* to allow axial movement of the volume setting member as illustrated and described in connection with FIGS. 1*a* and 1*b*. In all other respects, the pipette 10 of FIGS. 3*a* and 3*b* are the same as those previously described for FIGS. 1*a* and 1*b*.

Figure 4:
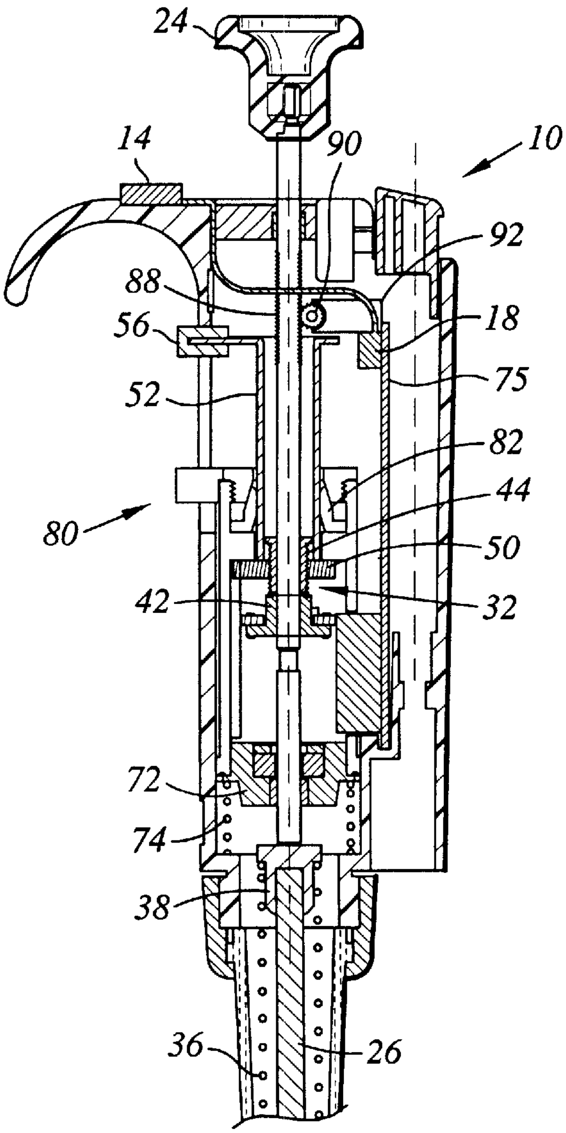
FIGS. 4 through 13 are sectional side views of an upper portions of a third through twelfth embodiments respectively of volume adjustable manual pipettes each having a quick set volume adjustment mechanism for simultaneously controlling the volume setting of the pipette and the electronic display in accordance with the present invention.
Figure 5:
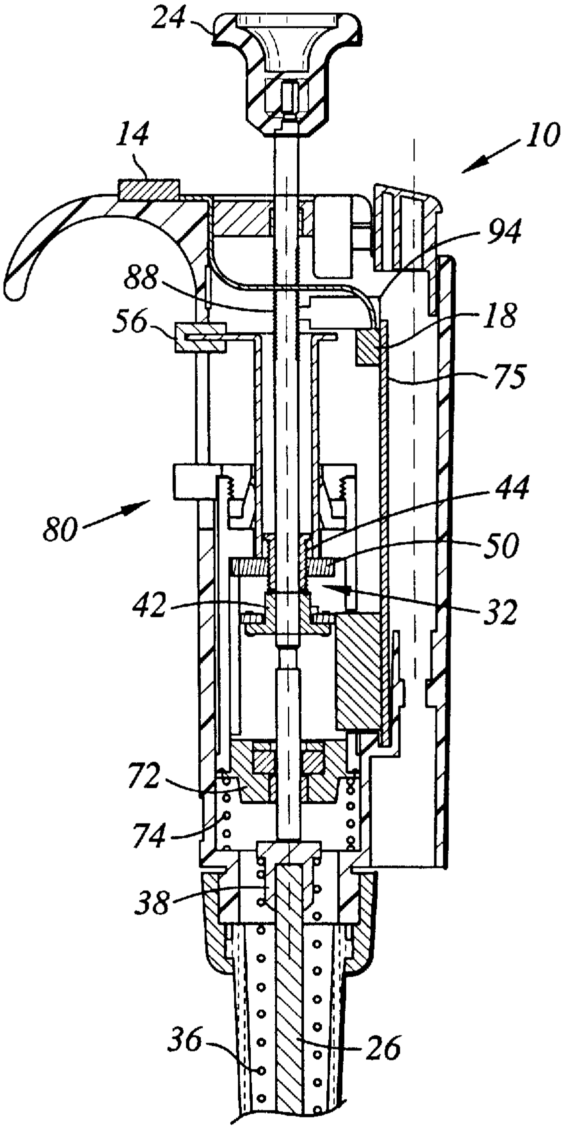

The embodiments of the pipette 10 illustrated in FIGS. 4 and 5 and are the same as the pipette described with respect to FIGS. 3*a* and 3*b,* except that the sensor target and sensor of FIGS. 3*a* and 3*b* are replaced by a series of vertically spaced concentric rings 88 on a ribbed portion of the plunger unit 20 extending into the tube 52. In FIG. 4 a gear 90 mates with the concentric rings 88, functioning as gear teeth on the plunger, to turn in response to vertical movement of the plunger unit 20 within the housing 12. Such turning of the gear 90 is sensed by a sensor 92, such as an optical sensor, which generates electrical signals indicative of the rotational position of the gear 90 and hence the axial position of the plunger unit 20 and volume setting member 32 within the housing. The electrical signals are transmitted to the control circuitry for processing and display as volume settings for the pipette by the display 14 as described in connection with the pipette 10 of FIGS. 1*a* and 1*b*. In FIG. 5, an optical sensor 94 directly detects the vertical movement of the rings 88 on the plunger 20 to generate such electrical signals.

Figure 6:
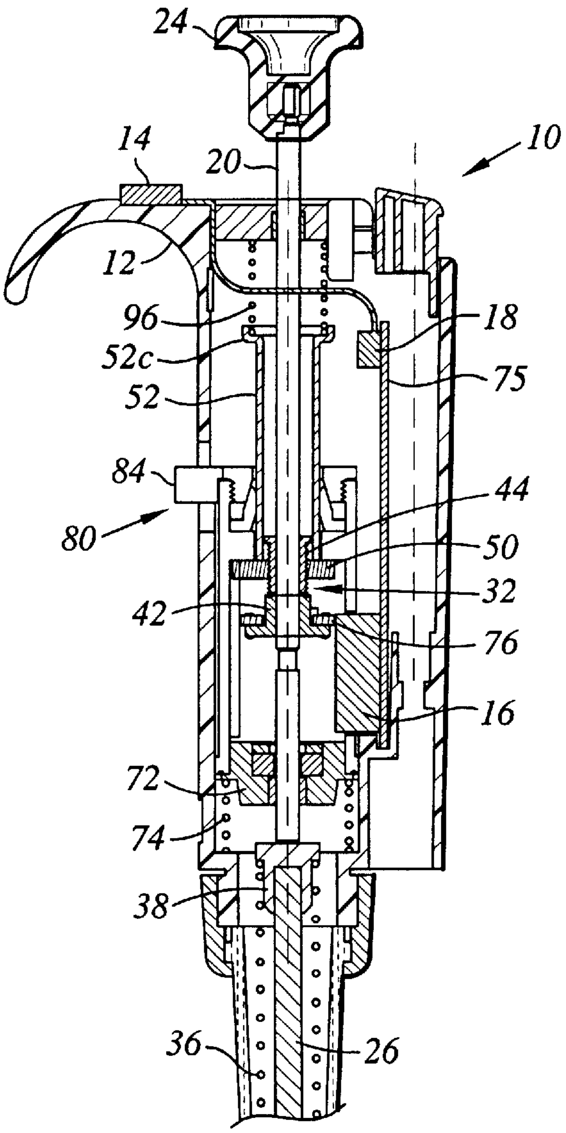

The embodiment illustrated in FIG. 6, is very similar to the embodiment illustrated in FIGS. 3A and 3B and corresponding reference numerals are use to represent corresponding parts. However, in FIG. 6, the knob 56 is removed from the tube 52. Also, instead of terminating in a lateral flange, the tube includes an upwardly facing collar 52*c* which acts as a bottom retainer for a vertically extending slide spring 96. As shown, the spring 96 is a coil spring coiling around and axially receiving the plunger unit within an upper portion of the housing. A lower end of the spring is supported on the collar 52*c* and an upper end of the spring bears upwardly on an underside of a top of the housing. Thus supported, the slide spring 96 continuously exerts a downward force on the tube 52 and hence on the nut 50 to which it is connected. Accordingly, upon a release of the locking mechanism 80, the spring 56 urges the tube 52, nut 50 and threaded sleeve 44 downwardly on the plunger unit 20. Such downward motion of course is resisted by the relatively strong return spring 36 which maintains the plunger unit in its upper position with the flange member 42 engaging a bottom of the volume setting member 32.

Thus, with the locking mechanism 80 in its released condition, the pipette user may rapidly readjust the volume setting of the pipette 10 depicted FIG. 6 by pressing downwardly on the push button 24 to move the flange 42 downwardly within the housing 12. As such downward movement occurs, it is followed by the downward movement of the tube 52, nut 50 and threaded sleeve 44 which continues in engagement with the flange 42 under the influence of the spring 96. Then, when it is desired to produce a fine adjustment of the volume setting for the pipette, the locking mechanism 80 is engaged to axially secure the tube 52 within the housing. Thus secured, the fine adjustment is accomplished by turning the knob 24, plunger unit 20 and threaded sleeve 44 within the nut 50 thereby changing the axial location of the lower end of the sleeve within the housing. As previously described, such axial movement of the sleeve 44 provides a fine adjustment of the volume setting for the pipette 10 which is detected by the sensor 16 and reflected as a real time change in the volume digitally displayed by the display 14.

Figure 7:
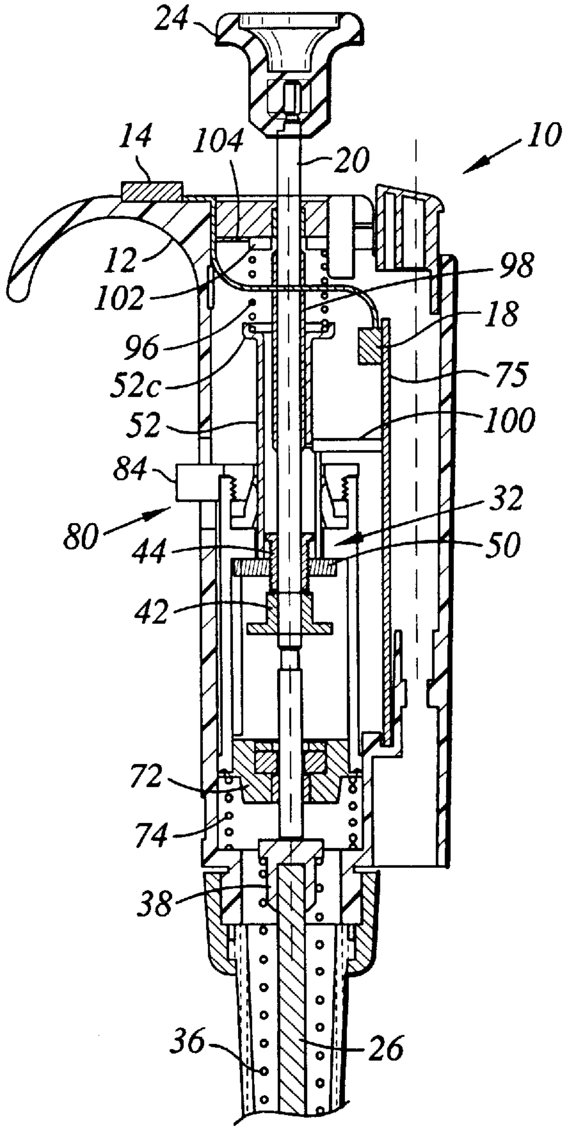

The embodiment of the present invention illustrated in FIG. 7 resembles that shown and previously described with respect to FIG. 6 with the exception that the sensor 16 and target 76 are replaced by a wire wound resistive element 98 and electrical contacts 100 and 102 engaging the resistive element 98. As illustrated, the resistive element 98 is wound on and bonded to the plunger unit 20 along an axial portion thereof within the housing 12. The contact 100 rides vertically on the resistive element and is secured to and extends from the printed circuit board 75. The electrical contact 102, on the other hand, is secured to an underside of a top of the housing 12 and is electrically connected to the resistive element 98 and by a cable 104 to the input to the microprocessor 18. The wire wound resistive element 98 and contacts 100 and 102 function as a potentiometer to present a resistance value to the microprocessor indicative of the axial location of the plunger unit 20 within the housing 12 and to provide a real time indication of the volume setting for the pipette on the display 14.

Figure 8:
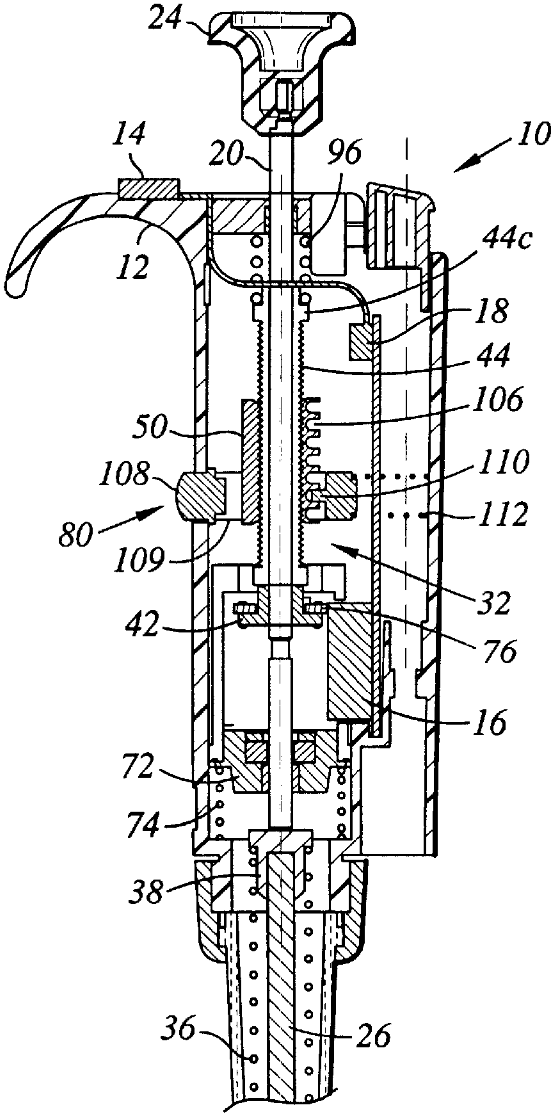

The embodiment of the present invention illustrated in FIG. 8 closely resembles that of FIG. 6 except that the embodiment of FIG. 8 does not include the tube 52, and, the spring 96 rather than bearing on the collar 52*c* engages and continuously presses downward on an upper surface of an annular collar 44*c* extending laterally from an axially extended version of the externally threaded sleeve 44. Further, the nut 50 in the embodiment of FIG. 8 also is axially extended and on one side includes a series of vertically spaced volume adjustment index holes 106. Still further, the user operable locking mechanism 80 in the embodiment of FIG. 8 includes a push button 108 carried by a spring loaded ring 109 and extending laterally through a side of the housing 12. Opposite the push button 108, an inner surface of the ring 109 includes a pin 110 which extends laterally into one of the index holes 106 in the nut 50. A lock spring 112 secured to an inside of the housing 12 bears on the ring 109 to continuously urge the ring and hence the push button 108 laterally to the left in FIG. 8 to releaseably secure the nut 50 within the housing 12.

In operation, when a pipette user desires to rapidly adjust or readjust the volume setting for the pipette 10 of FIG. 8, he or she first presses inwardly on the push button 108 to move the ring 109 laterally against the force of the lock spring 112 thereby releasing the pin 110 from the index holes 106. With the push button 108 thus depressed, the user then grips the control knob 24 and axially moves the plunger unit 20 up or down to rapidly adjust the position of the volume setting member 32 within the housing. Then, the user releases the push button 108 to engage the pin 110 in a different one of the holes 106 at a volume setting which is desired by the user and displayed in real time on the display 14. If the user then desires to affect a fine adjustment of the volume setting, he or she simply turns control knob 24 to affect a turning of the plunger unit 20 and with it a turning of the threaded sleeve 44 to move the lower end thereof up or down to change the volume setting for the pipette 10 in the manner previously described.

Figure 9:
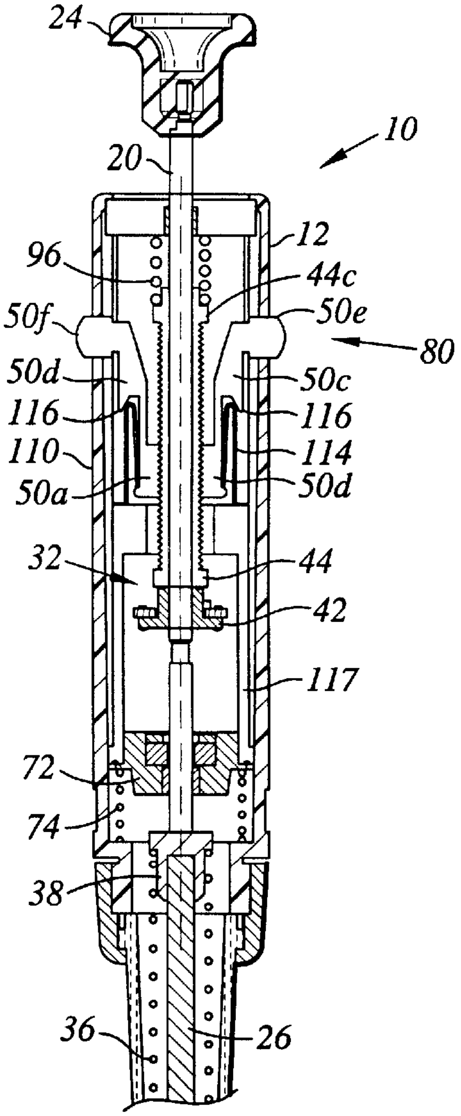

The embodiment of the present invention illustrated in FIG. 9 is shown in a front sectional view which does not show the sensor or control circuitry or the associated display 14. The embodiment resembles closely that depicted and described in connection with FIG. 8 except that the nut 50 is a divided or split nut having two mating halves 50*a* and 50*b*. When moved radially inward to the position indicated in FIG. 9, the halves 50*a* and 50*b* form a circular nut shape having internal threads mating with the external thread on the sleeve 44 in the same manner as the nut 50 and the sleeve 44 in FIG. 8. The halves of the nut 50*a* and 50*b* include upwardly projecting arms 50*c* and 50*d* respectively carrying laterally projecting push buttons 50*e* and 50*f* respectively. As shown, the push buttons 50*e* and 50*f* extend through opposite sidewalls of the housing 12 and the arms 50*c* and 50*d* are continuously urged in lateral outward directions by inverted u-shaped leaf springs 114 each including a hook style pivot 116. More particularly, one end of each spring 114 is supported on a tubular lock retainer 117 within the housing 12 while an opposite end of each spring is secured to a different one of the nut halves 50*a* or 50*b* to continuously exist a lateral inward force thereon.

Thus constructed, when the pipette user desires to effect a rapid adjustment or readjustment of the set volume for the pipette 10 illustrated in FIG. 9, he or she simply presses inwardly on the push buttons 50*e* and 50*f*. This causes the arms 50*c* and 50*d* to pivot on the pivots 116 and to move the halves 50*a* and 50*b* of the nut 50 outwardly thereby releasing contact with the externally threaded sleeve 44 of the volume adjust mechanism 32. Thus released, the pipette user may grip the control knob 24 and simply move the plunger unit 20 vertically to effect a rapid relocation of the plunger unit within the housing 12. When the desired volume has been reached as indicated by the volume digitally displayed on the display unit 14, the operator simply releases the push buttons 50*e* and 50*f* causing the arms 50*c* and 50*d* to return to their normal position as illustrated in FIG. 9 with the halves 50*a* and 50*b* of the nut 50 engaging the outer surface of the sleeve 44. Then, a turning of the plunger unit 20 in response to a turning of the control knob 24 will effect a fine adjustment of the volume setting in the manner previously described.

Figure 10:
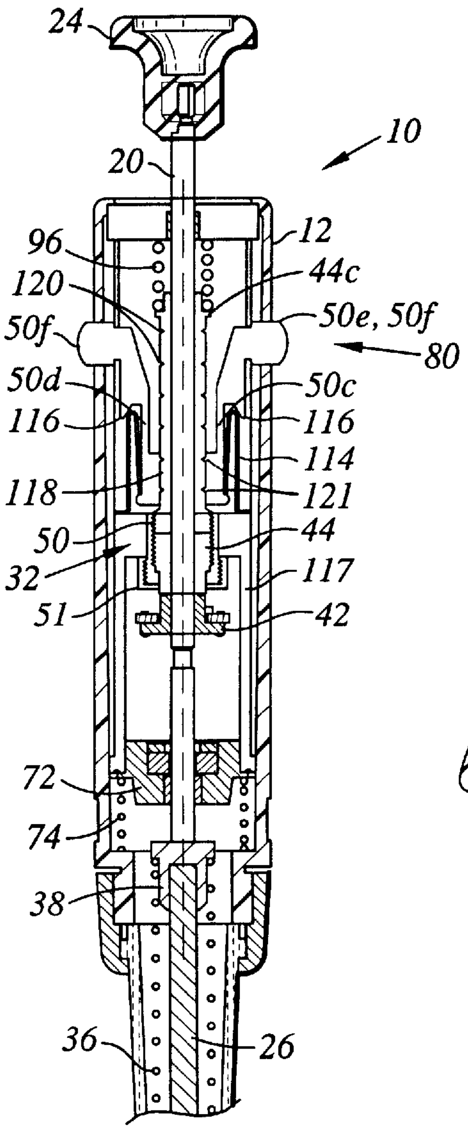

The embodiment illustrated in FIG. 10 resembles the embodiment of FIG. 9 except that the embodiment of FIG. 10 includes a split locking mechanism 80 rather than a split nut 50 as depicted in FIG. 9. In FIG. 10, the nut 50 remains intact, as a thin walled nut having an external vertical keyway for receiving a key (not shown) extending from the lock retainer 117 to secure the nut against turning relative to the retainer. As in the other embodiments, the externally threaded sleeve 44 (i) mates with and turns relative the nut 50 to provide adjustment of the volume setting of the pipette 10 and (ii) is moveable axially with the nut relative to the plunger unit.

In the embodiment of FIG. 10 however, an upwardly facing internally threaded collar 51 (functioning as a retainer for the fine adjustment of the set volume of the pipette 10) extends downwardly from the lock retainer 117 to mate with an externally threaded extension from the nut 50. A lower laterally extending portion of the collar 51 limits downward axial movement at the sleeve 44 relative to the nut 50 to limit the fine adjustment to the set volume by the sleeve 44.

Also, an indexing sleeve 118 extends axially within the housing 12 from a top of the nut 50 and includes a series of vertically spaced indexing grooves 120. In FIG. 10, the user operable locking mechanism 80 includes the previously described push buttons 50*e* and 50*f* illustrated in FIG. 9 as well as the support arms 50*c* and 50*d*, the leaf springs 114 and hook style pivots 116. However, the lower end of the arms 50*c* and 50*d* carry indexing ribs 121 for mating with the indexing grooves 120 in the sleeve 118 as illustrated. Such indexing holds the indexing sleeve 118 and hence the nut 50 axially fixed within the housing 12. Then, when it is desired to effect a rapid adjustment of the volume setting for the pipette 10, the user simply presses inwardly on the push buttons 50*e* and 50*f*, as previously described, to effect a release of the indexing ribs 121 from the indexing grooves 120. This frees the sleeve 44 and the nut 50 for axial movement with the plunger unit 20 in response to vertical movement thereof in the manner previously described. When the desired volume setting for the pipette has been achieved, the push buttons 50*e* and 50*f* are released to engage the locking mechanism 80 with the indexing ribs 121 in a different indexing groove 120 in the indexing sleeve 118 to fix the nut 50 within the housing 12. Subsequently, a turning of the plunger unit 20 via the control knob 24 will produce a fine adjustment of the set volume for the pipette in the manner previously described.

In such operation, it is to be noted that the spring 96 bears on the top of the indexing sleeve 118 to continuously exert a downward force thereof and to insure that the nut 50 and the mating sleeve 44 are continuously urged in a downward direction and maintained against the upper surface of the flange 42 during axial movement of the plunger unit 20 within the housing 12.

Figure 11:
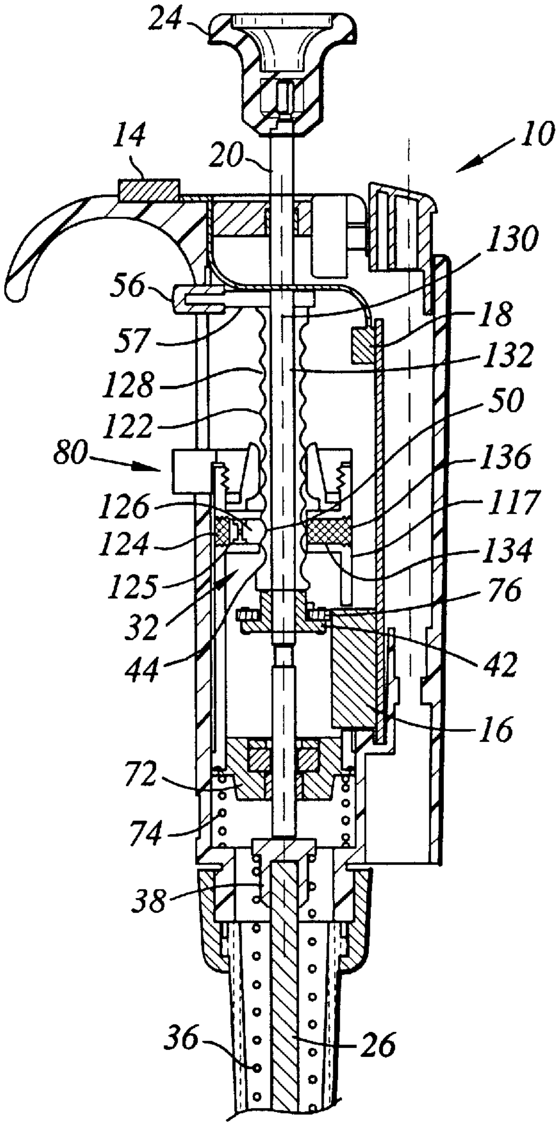
Figure 12:
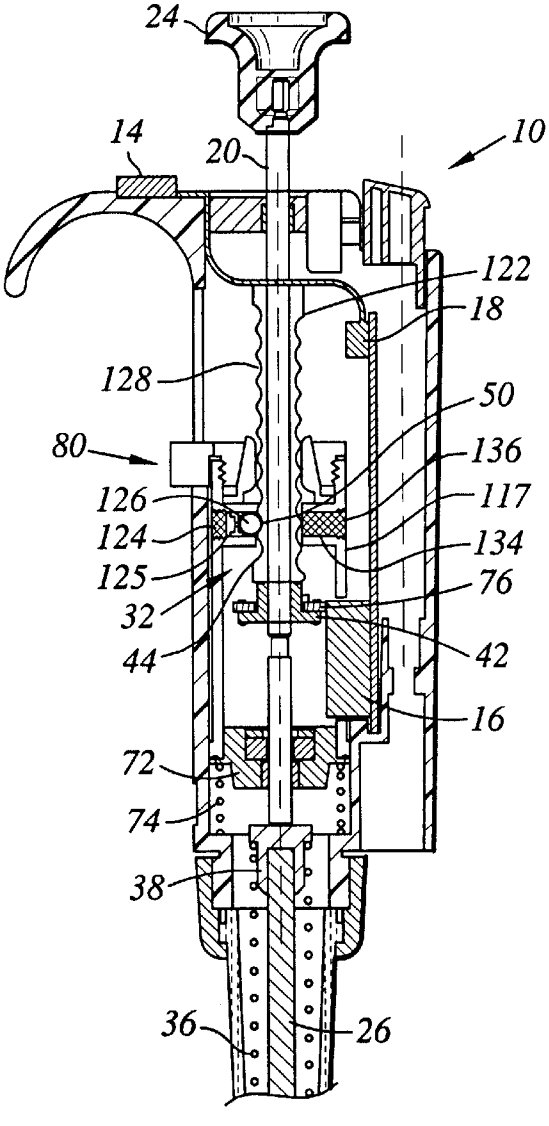
Figure 13:
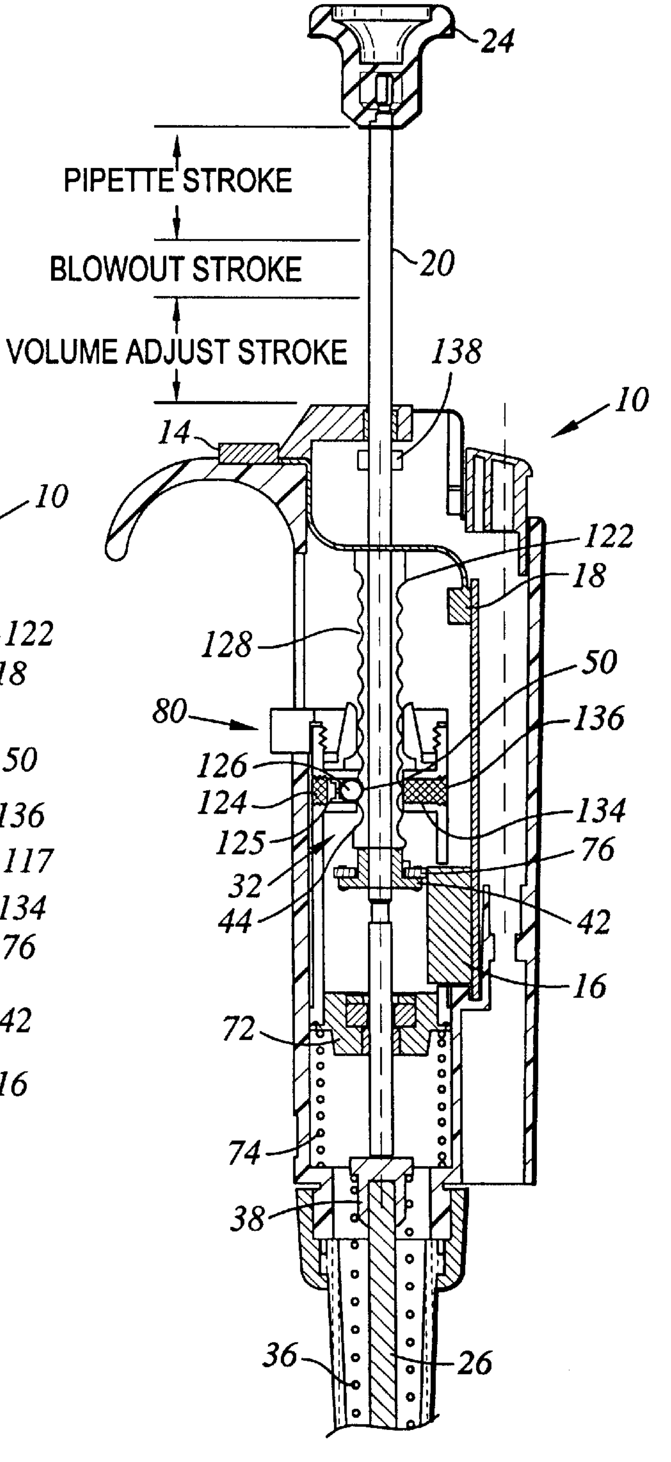

The embodiments illustrated in FIGS. 11, 12 and 13 also resemble the pipette 10 illustrated in FIGS. 3A and 3B. In FIG. 11 however, the illustrated embodiment includes a ball screw 122 as the externally threaded sleeve 44 while the nut 50 comprises a spring loaded ball mechanism 124 located in a cavity 125 in the lock retainer 117 on one side of the ball screw. As shown, the mechanism 124 includes a ball 126 riding in the relatively broad spiral threads 128 of the ball screw 122.

More specifically, the ball screw 122 includes a non-circular axial hole 130 for receiving a similarly shaped axial portion 132 of the plunger unit 20 such that the plunger unit 20 is free to move axially relative to the ball screw 122. Yet, a turning of the plunger unit 20 in the manner previously discussed, produces a like turning of the ball screw with the spring loaded ball 126 riding in the thread 128. This produces an axial movement of the ball screw in the housing 12 to axially adjust the location of the volume setting mechanism 32 and hence the volume displayed by the display 14 as previously described. In such axial movement, the lateral forces excited by the ball 126 on the ball screw 122 is balanced by a wear block 134. As shown, the wear block 134 is secured in a cavity 136 in the lock retainer 117 facing the ball 126, all this illustrated in FIG. 11.

With the structure illustrated in FIG. 11, when a pipette user desires to effect a rapid adjustment or re-adjustment of the volume setting of the pipette 10, he or she simply releases the user operable locking mechanism 80 in the manner previously described. This releases the ball screw 122 for axial movement in the housing 12. Such axial movement of the ball screw 122 is effected by a pipette user grasping the slide adjustment knob 56 extending from an arm 57 located atop the ball screw. The connection between the arm 57 and the ball screw 122 allows the ball screw to turn freely relative to the arm. However, the vertical movement of the arm 57 causes the ball screw 122 to move vertically within the housing 12. Since the flange member 42 is secured to the plunger unit 20 and the plunger unit 20 is continuously urged upward by the return spring 36, the flange member 42 is continuously urged against a bottom of the ball screw 122 whereby the ball screw and the flange member are maintained in continuous contact with vertical movement of the plunger unit after the locking mechanism 80 has been released. Thus, with such rapid axial movement of the plunger unit 20, the sensor 16 continuously monitors the axial position of the ball screw within the housing 12 by continuously monitoring the sensor target 76 on the flange member 42 to provide a continuous real time display of the volume setting for the pipette 10 on the display 14 all as previously described. When the desired volume setting is displayed, vertical movement of the plunger unit 20 is halted and the ball mechanism 124 maintains the plunger unit 20 and the ball and ball screw combination comprising the nut 50 and threaded sleeve 44 for the embodiment of FIG. 11 at the desired vertical location within the housing 12.

When the locking mechanism 80 is in it's released condition, a fine adjustment of the volume setting may be made by turning the plunger unit 20 in response to a manual turning of the control knob 24. This causes the ball screw 122 to move axially relative to the stationary ball 126 comprising and likewise causes a bottom surface of the ball screw to move axially within the housing to effect a fine adjustment of the volume setting in the manner previously described. After the desired volume setting has been achieved, the user operable locking mechanism 80 may be again engaged to lock the ball screw 122 in its desired axial position within the housing.

The embodiments of the present invention show in FIGS. 12 and 13 are similar to the embodiment shown in FIG. 11. In FIG. 12, however, the arms 56 57 have been deleted and a quick adjustment of the volume setting is only possible with upward vertical movement of the plunger unit 20 within the housing 12. In FIG. 13, a collar 138 is carried by the plunger unit 20 above the ball screw 122 and is axially located such that as the plunger unit 20 is moved downwardly, the collar engages the top of the ball screw after the plunger unit has traveled vertically downward through the pipette stroke and blow out stroke for the air displacement pipette 10. Further downward movement of the plunger unit 20 is accommodated in the pipette 10 and by virtue of the contact of the collar 138 and with the ball screw 122 such further downward movement of the plunger unit 20 moves the ball screw 122 downward to rapidly change the volume setting for the pipette as described relative to FIG. 11. Thereafter a turning of the plunger unit will provide a fine adjustment of the volume setting with the bottom of the ball screw engaging the flange member 42 to effect vertical movement of the target sensor 76 relative to the sensor 16 in the manner previously described.

While particular embodiments of the present invention have been illustrated and described in detail above, it is appreciated the changes and modifications may be made in the illustrated embodiments without departing from the spirit of the invention. Accordingly, the scope of present invention is to be limited only by the terms of the following claims.

What is claimed is:

1. A volume adjustable manual pipette, comprising:

an axially elongated hand-holdable housing supporting (i) an electronic digital display and associated position sensing and control circuitry, (ii) a plunger unit and (iii) a quick set volume adjustment mechanism for simultaneously controlling the volume setting of the pipette and the electronic display, the quick set volume adjustment mechanism comprising:

a pipette volume setting member for limiting upward movement of the plunger unit within the housing to define the volume setting for the pipette, the volume setting member being supported for axial movement on the plunger unit and a pipette user operable locking mechanism releasably securing the volume setting member relative to the housing such that when the volume setting member is released from the housing the volume setting member is axially moveable on and with the plunger unit to quickly set the volume for the pipette and when the volume setting member is secured to the housing the plunger unit is axially moveable relative to the volume setting member to aspirate and dispense liquid into and from a pipette tip secured to a hollow shaft extending from a lower end of the housing; and the sensing and control circuitry monitoring the volume setting to provide a real time display of the volume setting of the pipette on the electronic digital display.

2. The pipette of claim 1 further including a user moveable member for axially moving the volume setting member within the housing after the release thereof from the housing.

3. The pipette of claim 1 wherein the threaded member is supported within the housing to move axially with the sleeve and the plunger unit when the volume setting member is released by the locking mechanism from the housing to provide the rapid adjustment of the volume setting for the pipette.

4. The pipette of claim 3 wherein the locking mechanism comprises:

support means for releasably securing the threaded member relative to the housing such that (i) upon release of the threaded member from the housing, the sleeve is free to move axially with the threaded member to produce a quick axial adjustment of the position of the sleeve within the housing and hence the volume setting of the pipette and (ii) when secured to the housing, a turning of the plunger unit produces a fine axial adjustment of the position of the sleeve within the housing and hence the volume setting of the pipette as sensed by the sensor means and displayed by the display.

5. The pipette of claim 4 wherein the locking mechanism comprises a lever lock for locking the threaded member relative to the housing and for releasing the threaded member to move axially within the housing with the sleeve to rapidly adjust the volume setting for the pipette.

6. The pipette of claim 4 wherein the user operable lock mechanism comprises a friction brake releasably locking the threaded member relative to the housing.

7. The pipette of claim 4 wherein the user operable lock mechanism comprises:

a series of vertically spaced index holes in a side of the threaded member; and a spring biased push button mechanism including a pin for laterally riding into and out of different ones of the index holes upon axial movement of the sleeve and threaded member to rapidly reset the volume of the pipette.

8. The pipette of claim 4 further including spring means for urging the sleeve in a downward direction within the housing.

9. The pipette of claim 4 wherein the user operable lock mechanism comprises:

a series of vertically spaced index holes in a side of the threaded member; and a spring biased push button mechanism including a pin for laterally riding into and out of different ones of the index holes upon axial movement of the sleeve and threaded member to rapidly reset the volume of the pipette.

10. The pipette of claim 4 wherein the threaded member comprises a split nut supported for lateral outwardly and inward movement by a pipette user to release from and engage the sleeve when it is desired to rapidly and then finely adjust the volume setting of the pipette.

11. The pipette of claim 4 wherein the threaded member includes an axially extending indexing sleeve axially receiving the plunger unit and the user operable locking mechanism comprises user actuatable inwardly extending members for engaging and releasing from the indexing sleeve.

12. The pipette of claim 4 wherein the sleeve defining the upper stop member comprises a tubular ball screw axially receiving the plunger unit and the threaded member comprises a spring loaded ball for riding in the screw of the ball screw.

13. The pipette of claim 12 including a collar on the plunger unit above the ball screw for moving with the plunger unit to engage the ball screw upon downward relative movement of the ball screw within the housing.

14. The pipette of claim 12 further including an arm extending from the ball screw for axially moving the ball screw upon a release of the user operable lock mechanism to rapidly reset the volume of the pipette.

15. The pipette of claim 12 including a collar on the plunger unit above the ball screw for moving with the plunger unit to engage the ball screw upon downward relative movement of the ball screw within the housing.

16. The pipette of claim 1 wherein the sleeve is externally threaded and keyed to turn with the plunger unit relative to the threaded member comprising an internally threaded nut.

17. The pipette of claim 1 further including spring means for urging the volume setting member in a downward direction within the housing.

* * * * *

UNITED STATES PATENT AND TRADEMARK OFFICE

CERTIFICATE OF CORRECTION

PATENT NO. : 6,428,750 B1
DATED : August 6, 2002
INVENTOR(S) : Kenneth Rainin et al.

It is certified that error appears in the above-identified patent and that said Letters Patent is hereby corrected as shown below:

Column 11,
Lines 15-44, replace claim 1 with the following:

1. A volume adjustable manual pipette, comprising:

an axially elongated hand-holdable housing supporting (i) a display and associated position sensing and control means, (ii) a plunger unit and (iii) a quick set volume adjustment mechanism for simultaneously controlling the volume setting of the pipette and the display, the quick set volume adjustment mechanism comprising:

a pipette volume setting member for limiting upward movement of the plunger unit within the housing to define the volume setting for the pipette, the volume setting member comprising a threaded sleeve mating with a rotationally fixed threaded member and defining an upper stop member for the plunger unit, the sleeve axially receiving the plunger unit to move axially thereon and with the plunger unit to provide a rapid adjustment of the volume setting for the pipette and being supported for turning relative to the rotationally fixed threaded member to provide a fine adjustment of the volume setting for the pipette and a pipette user operable locking mechanism releasably securing the volume setting member relative to the housing such that when the volume setting member is released from the housing the sleeve is quickly moveable axially on and with the plunger unit to quickly adjust the volume setting for the pipette and when the volume setting member is secured to the housing (i) the sleeve is turnable with the plunger unit relative to the threaded member to finely adjust the volume setting for the pipette and (ii) the plunger unit is axially moveable relative to the sleeve to aspirate and dispense liquid into and from a pipette tip secured to a hollow shaft extending from a lower end of the housing; and the sensing and control means monitoring the volume setting to provide a display of the volume setting of the pipette on the display.

UNITED STATES PATENT AND TRADEMARK OFFICE

CERTIFICATE OF CORRECTION

PATENT NO. : 6,428,750 B1
DATED : August 6, 2002
INVENTOR(S) : Kenneth Rainin et al.

It is certified that error appears in the above-identified patent and that said Letters Patent is hereby corrected as shown below:

Column 12,
Lines 22-31, replace claim 9 with the following:

9. The pipette of claim 1 wherein the sensing and control means comprises:

a vertically extending series of teeth on the plunger unit;

a gear mating with the teeth for turning with vertical movement of the plunger unit; and sensor means for monitoring the turning of the gear to generate an electrical signal indicative of the axial position of the plunger unit for processing by circuitry comprising the sensor and control means to electronically display the volume setting on an electronic digital display comprising the display.

Lines 56-59, replace claim 15 with the following:

15. The pipette of claim 1 wherein the sensor and control means comprises:

a microprocessor connected to the display and including sensor inputs for receiving plunger unit position indications, one of the sensor inputs to the microprocessor being a plunger unit home position sensor.

Signed and Sealed this

Eighteenth Day of February, 2003

JAMES E. ROGAN
*Director of the United States Patent and Trademark Office*